(12) United States Patent
Wang et al.

(10) Patent No.: US 11,294,792 B2
(45) Date of Patent: *Apr. 5, 2022

(54) AUTOMATED REVIEW OF SOURCE CODE FOR STYLE ISSUES

(71) Applicant: Rubrik, Inc., Palo Alto, CA (US)

(72) Inventors: Zhicong Wang, San Francisco, CA (US); Pranava Adduri, Fremont, CA (US); Abhinav Adduri, Fremont, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,443

(22) Filed: Jan. 8, 2021

(65) Prior Publication Data

US 2021/0209000 A1 Jul. 8, 2021

Related U.S. Application Data

(63) Continuation of application No. 16/891,986, filed on Jun. 3, 2020, now abandoned, which is a continuation of application No. 16/196,506, filed on Nov. 20, 2018, now Pat. No. 10,769,046.

(51) Int. Cl.
*G06F 11/36* (2006.01)

(52) U.S. Cl.
CPC ...... *G06F 11/3616* (2013.01); *G06F 11/3608* (2013.01)

(58) Field of Classification Search
CPC .......................... G06F 11/3616; G06F 11/3608
USPC .................................................. 717/124–140
See application file for complete search history.

(56) References Cited

U.S. PATENT DOCUMENTS

| | | | |
|---|---|---|---|
| 5,768,591 A * | 6/1998 | Robinson | G06F 9/465 709/201 |
| 5,963,739 A * | 10/1999 | Homeier | G06F 11/3608 714/E11.209 |
| 6,473,794 B1 * | 10/2002 | Guheen | H04L 41/22 709/223 |
| 7,334,163 B1 | 2/2008 | Sallam | |
| 7,574,704 B2 | 8/2009 | Fulton et al. | |
| 7,596,778 B2 * | 9/2009 | Kolawa | G06F 11/3688 717/126 |
| 7,627,861 B2 | 12/2009 | Smith et al. | |
| 7,802,493 B2 | 9/2010 | Kubota et al. | |
| 7,895,575 B2 | 2/2011 | Yoon et al. | |

(Continued)

OTHER PUBLICATIONS

Wiese et al, "Replicating Novices' Struggles with Coding Style", IEEE, pp. 13-18 (Year: 2019).*

(Continued)

*Primary Examiner* — Anil Khatri
(74) *Attorney, Agent, or Firm* — Schwegman Lundberg & Woessner, P.A.

(57) ABSTRACT

In one aspect, a computer system automatically identifies style issues in a source code base. A reference set for a known style issue includes source code examples that exhibit the style issue. The source code examples in the reference set are compared to the source code base, for example using string convolution. Based on the comparison, locations in the source code base that are likely to exhibit the style issue are identified. Various steps in the processing may be implemented using machine learning models, clustering or other automated data science techniques.

19 Claims, 6 Drawing Sheets

(56) References Cited

U.S. PATENT DOCUMENTS

| | | | |
|---|---|---|---|
| 7,926,036 B2* | 4/2011 | Nagappan | G06F 11/3616 717/124 |
| 7,950,004 B2* | 5/2011 | Vieira | G06F 11/3688 717/125 |
| 8,205,191 B1 | 6/2012 | Kolawa et al. | |
| 8,276,123 B1 | 9/2012 | Deng et al. | |
| 8,336,028 B2 | 12/2012 | Hinton et al. | |
| 8,429,632 B1 | 4/2013 | Coutant et al. | |
| 8,627,287 B2* | 1/2014 | Fanning | G06F 11/3616 717/124 |
| 8,881,112 B2* | 11/2014 | Corsetti | G06F 11/3616 717/126 |
| 9,021,441 B2* | 4/2015 | Yawalkar | G06F 11/3616 717/125 |
| 9,110,770 B1 | 8/2015 | Raju et al. | |
| 9,430,583 B1 | 8/2016 | Flake | |
| 9,727,448 B1 | 8/2017 | Seibert, Jr. et al. | |
| 9,727,736 B1* | 8/2017 | McClintock | G06F 8/77 |
| 10,089,463 B1 | 10/2018 | Katz et al. | |
| 10,303,517 B1* | 5/2019 | Sloyan | G06F 8/71 |
| 10,769,046 B2 | 9/2020 | Wang et al. | |
| 2020/0159643 A1 | 5/2020 | Wang et al. | |

OTHER PUBLICATIONS

Ueda et al., "Impact of Coding Style Checker on Code Review—A case study on the OpenStack projects", IEEE, pp. 31-36 (Year: 2018).*

Ayewah et al., "Using Static Analysis to Find Bugs", IEEE, pp. 22-29 (Year: 2008).*

Mirza et al, "Suitability of BlackBox Dataset for Style Analysis in Detection of Source Code Plagiarism", IEEE, pp. 90-94 (Year: 2017).*

Gall et al., "The Architectural Style of Component Programming", IEEE, pp. 18-25 (Year: 1997).*

"U.S. Appl. No. 16/196,506, Non Final Office Action daated Jan. 2, 2020", 19 pgs.

"Automated Review of Source Code for Style Issues", (Jun. 6, 1996), 17 pgs.

"Automated Review of Source Code for Style Issues", (1989), 7 pgs.

"U.S. Appl. No. 16/196,506, Response filed Apr. 2, 2020 to Non Final Office Action dated Jan. 2, 2020", 15 pgs.

"U.S. Appl. No. 16/196,506, Notice of Allowance dated Apr. 22, 2020", 14 pgs.

Kalliamvakou, "Open Source-Style Collaborative Development Practices in Commercial Projects Using GitHub", IEEE, (2015), 574-585.

Martinez, "Automatically Extracting Instances of Code Change Patterns with AST Analysis", IEEE, (2013), 388-391.

Ohno, "A Methodology to Teach Exemplary Coding Style Considering Students' Coding Style Feature Contains Fluctuations", IEEE, (2013), 1-3.

Reiss, "Automatic Code Stylizing", ACM, (2007), 74-83.

Robillard, "Representing Concerns in Source Code", ACM, (2007), 1-38.

* cited by examiner

AUTOMATED REVIEW OF SOURCE CODE FOR STYLE ISSUES

CLAIM OF PRIORITY

This application is a continuation of U.S. application Ser. No. 16/891,986, filed Jun. 3, 2020, which is a continuation of U.S. application Ser. No. 16/196,506, filed Nov. 20, 2018, each of which is hereby incorporated by reference in its entirety.

BACKGROUND

Technical Field

The present invention generally relates to reviewing source code for formatting issues.

Background Information

Traditionally, organizations have software engineers review source code for formatting errors along with higher-order logical errors. Countless hours are spent identifying and fixing code formatting issues (i.e. style issues) instead of focusing on the higher impact logic issues. This problem is compounded because the desired style may vary by organization (e.g., by company, by department, or even by project team), by coding language, and by project. As a result, there can be a large number of different styles, so that a single review cannot be blindly applied to all code bases and a single piece of review software cannot be developed to carry out all reviews. In addition, the style may not be formally documented in a style guide. Rather, it may be defined primarily in the software engineers' knowledge accumulated over time on a project or with a team and the effort required to formally document a style may not be a good use of software engineers' time. The styles may also evolve over time.

Thus, there is a need for better approaches to reviewing source code for style issues.

SUMMARY

In one aspect, a computer system automatically identifies style issues in a source code base. A reference set for a known style issue includes source code examples that exhibit that style issue. The source code examples in the reference set are compared to the source code base, for example using string convolution. Based on the comparison, locations in the source code base that are likely to exhibit the style issue are identified. Various steps in the processing may be implemented using machine learning models, clustering or other automated data science techniques.

Other aspects include components, devices, systems, improvements, methods, processes, applications, computer readable mediums, and other technologies related to any of the above.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
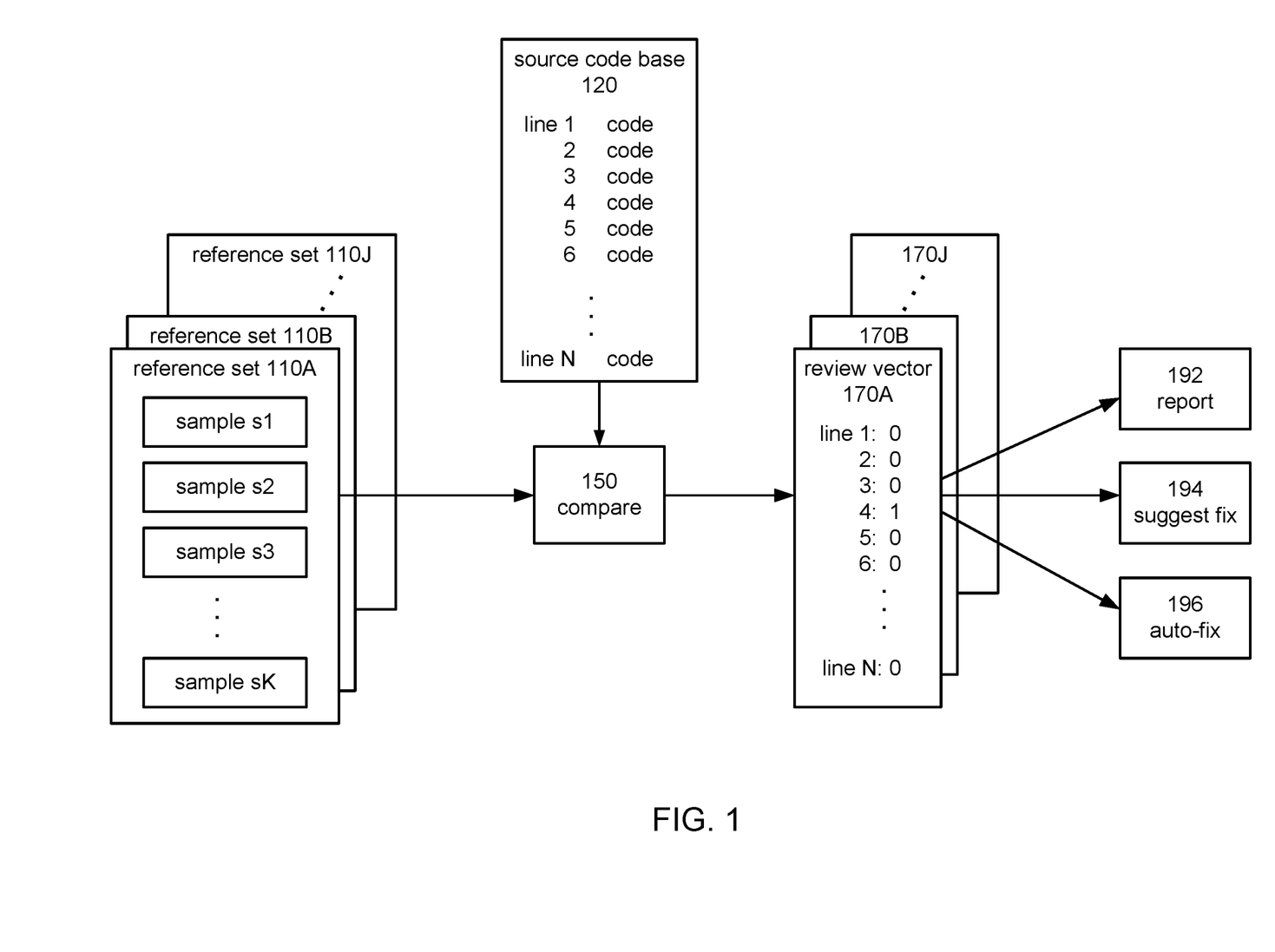
FIG. 1 is a diagram illustrating automatic identification of style issues in a source code base.

FIG. 1 is a diagram of a system for automatically identifying style issues in a source code base 120. The source code base 120 has N lines of source code, which in FIG. 1 are labelled as line 1 to line N. The system identifies style issues A-J. For each style issue A-J, there is a corresponding reference set 110A-J. Each reference set 110 includes a number of source code samples s1-sK. The number K of samples may be different for each style issue and reference set. The reference set 110 includes source code examples that are known to exhibit the style issue. The reference set 110 may also include source code counter-examples that are known to not exhibit the style issue. If the reference set 110 includes both examples and counter-examples, then the samples are also marked as being either an example or counter-example.

Examples of style issues include extra newlines, extra spaces, missing newlines, missing spaces, unwanted indentation, no space before opening brackets for example "if ( . . . ){", and no brackets for a switch statement.

Using extra newline as an example, the corresponding reference set 110A includes source code examples sk known to have extra newlines and may also include source code counter-examples sk known to be free from extra newlines, for example situations in which two consecutive newlines are appropriate and not a style error. Reference set 110B may be used to detect extra space issues, reference set 110C to detect missing newlines, and so on. In some sense, each reference set 110 is a definition of the corresponding style issue, but it is a definition implied by the samples in the reference set rather than an explicit definition.

The samples skin each reference set 110 are compared 150 to the source code base 120. Based on this comparison, the locations in the source code base that are likely to exhibit a particular style issue are identified. In FIG. 1, this is represented by the "review" vectors 170A-J. "Review" is just a label to identify that this vector is the result of a style review. Review vector 170A is a vector of bits indicating whether each line in the source code base 120 exhibits the style issue corresponding to reference set 110A. Here, 1 indicates the style issue is present and 0 indicates it is not. In this example, the review vector 170A indicates that lines 1-3 likely do not have an extra newline error, but line 4 likely does. Each type of style issue A-J has a corresponding review vector 170A-J.

The review vectors 170 may be used in different ways. For example, all of the review vectors 170 may be combined to generate 192 a code review report that lists the locations in the source code base that are likely to have different style issues. The software engineer can then use this code review report to review and correct issues in the source code base. Going one step further, the system may automatically suggest 194 corrections for some or all of the identified style issues. Even one step further, the system may auto-correct 196 the identified style issues.

In some implementations, these actions 192, 194, 196 may take place in real-time as the software engineer is creating the source code base 120. Alternatively, these actions 192, 194, 196 may occur in batch mode at one time for the entire source code base 120.

Figure 2:
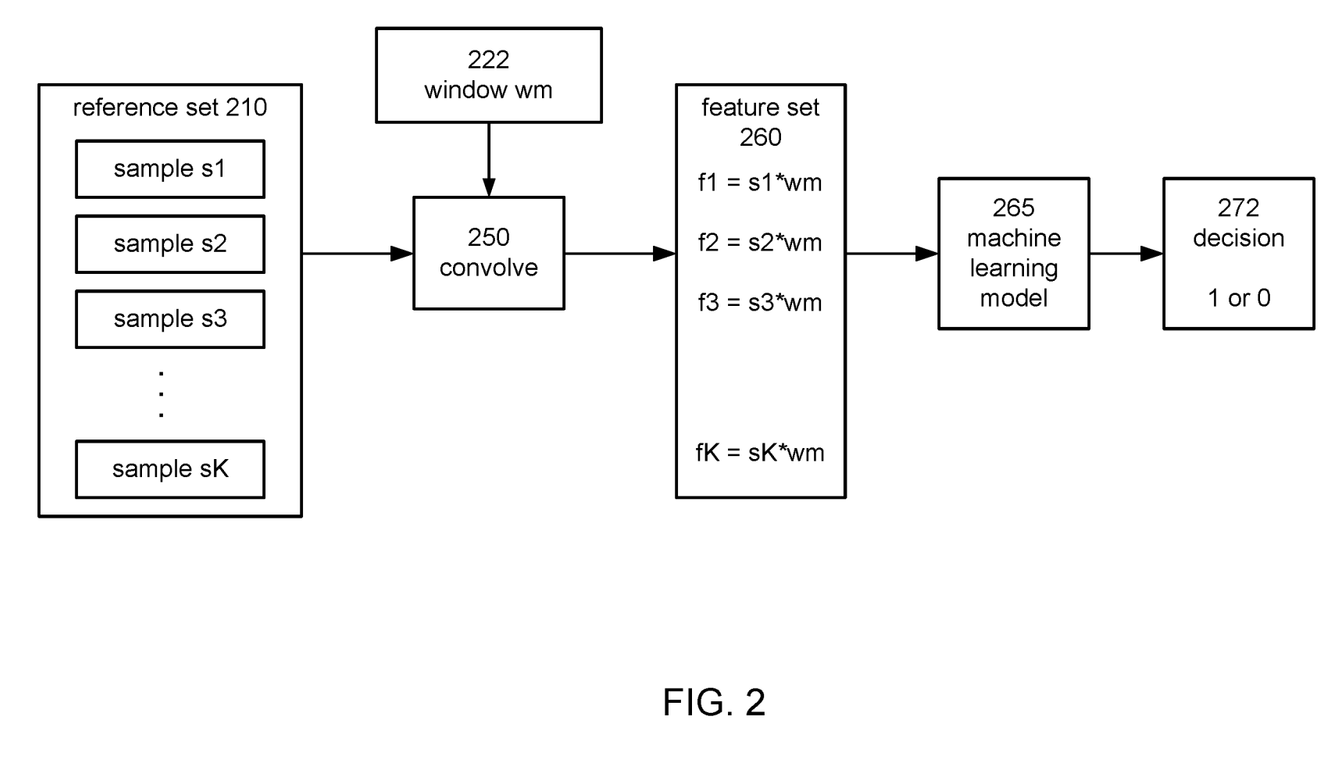
FIG. 2 is a diagram illustrating automatic identification of a single style issue within a single window of source code, using string convolution.

FIG. 2 is a diagram illustrating a particular embodiment of FIG. 1 in more detail. FIG. 2 shows automatic identification of a single style issue within a single window of source code, using string convolution. In this example, the reference set 210 for the style issue of interest includes samples sk that are all three lines long. For example, these may be source code examples of the style issue collected from prior style reviews. Each sample includes the line with the style error, the line immediately before the line with the error, and the line immediately after the line with the error. This gives some context for the style error. Whether context is required and how much context is appropriate will depend on the type of error. For example, extra newline errors typically require surrounding lines to positively identify the error. If no surrounding lines were provided, then every newline in the source code base 120 might be identified as an extra newline error. On the other hand, errors such as extra space around comma may have sufficient context within just the line containing the error so that additional lines may not be required. In this example, assume that the samples sk are each three lines long.

Because the samples sk are 3-line samples and because string convolution is used for comparison, the source code base is also evaluated in terms of 3-line windows. That is, lines 1-3 (window 1) are evaluated for possible error, lines 2-4 (window 2) are evaluated for possible error, lines 3-5 (window 3) are evaluated for possible error, and so on. FIG. 2 shows the evaluation of a single 3-line window 222.

In this example, string convolution 250 is used to generate a feature set 260, which is further processed 265 to generate the single bit 272 that indicates whether the window 222 is likely to exhibit this particular style error. Comparing FIG. 2 and FIG. 1, assume that the reference set is for style issue A and that window 222 is the window for line 4 of the source code base, then the single bit 272 is the bit (with value 1 in FIG. 1) corresponding to line 4 in the review vector 170A.

The feature set 260 includes features f1-fK, which correspond to the samples s1-sK. The feature fk for a specific sample sk is based on the string convolution of the sample sk with the window wm. Use the * symbol to represent the string convolution. Then feature fk is based on sk*wm. The string convolution sk*wm is itself a function. It is calculated by shifting sk relative to wm by a certain number of characters, making a character-by-character XOR comparison between the two (i.e., =1 if the two characters are the same, and =0 if different), and summing the values of the XOR comparisons. The result is a function of the shift amount, for example if sk and wm are aligned or if sk is shifted left or right by x characters. Accordingly, the feature fk could be the entire string convolution function, or it could be reduced to a single number or to a set of numbers. In this example, fk is calculated as the peak value of the string convolution, normalized by the number of characters in the window wm. Examples of sets of numbers that might be used as the feature fk include the peak value and second highest value (and their separation), or the peak value and the width of the peak, or possibly the peak value and the minimum value.

In FIG. 2, the peak value is used so the feature set 260 is a vector of analog values fk. Each feature fk is the individual score for sample sk. These individual scores are combined to calculate the decision bit 272 for this reference set and window. In FIG. 2, a machine learning model 265 is used to make this decision. In one approach, the individual analog scores fk are thresholded to produce binary decisions for each sample sk (i.e., whether the sample sk indicates that the window wm is likely to exhibit the particular style error), and these binary decisions are then combined to determine the final binary outcome 272 for the reference set. In another approach, the individual analog scores fk are combined into a single aggregate analog score, which is then thresholded to determine the final binary decision 272.

In addition, features may not be of equal importance. Weights can be used to emphasize more important or more distinguishing features. That is, some features may be weighted more heavily than others.

A machine learning model 265 may be used for any or all of the steps described above, including determining the appropriate thresholds and/or weights. The machine learning model 265 typically is trained based on tagged windows, for example from prior code reviews.

Figure 3:
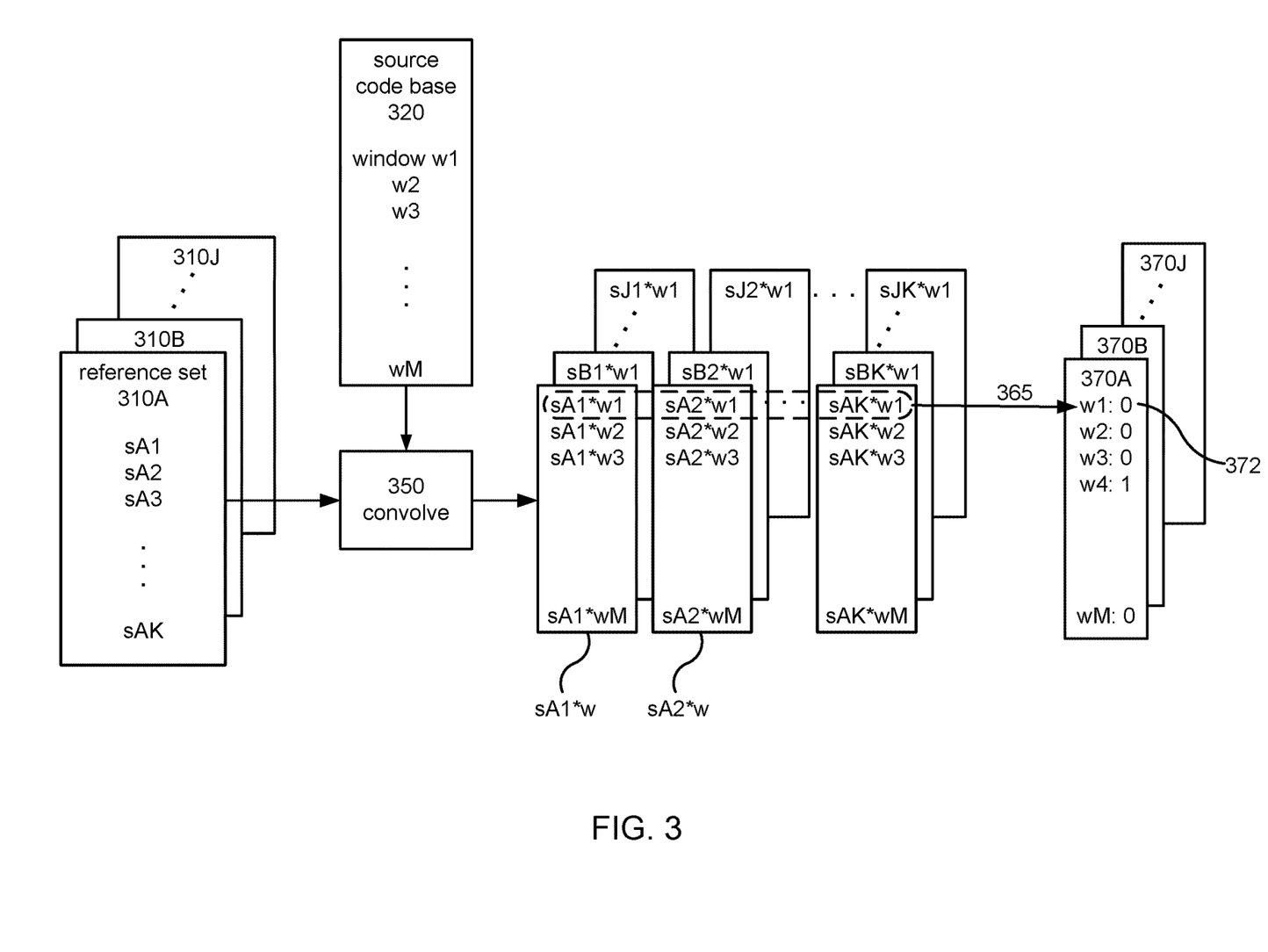
FIG. 3 is a diagram illustrating an implementation of the system in FIG. 2, extended to automatic identification of multiple style issues for an entire source code base.

FIG. 3 is a diagram illustrating an implementation of the system in FIG. 2, extended to automatic identification of multiple style issues for an entire source code base. FIG. 3 is provided to illustrate that various operations may be performed in different orders to take advantage of computational efficiencies. In FIG. 3, there are J reference sets 310A-J. Each reference set 310 contains K samples, where K may be different for each reference set. The samples for reference set 310A are labelled sA1, sA2 . . . sAK. The source code base 320 has N lines, which are divided into M windows labelled w1, w2 . . . wM. Using the above example, window w1 may be lines 1-3, window w2 may be lines 2-4, etc.

For computational efficiency, the string convolution 350 for a sample sAk is applied to the entire source code base at once, rather than separately for each window. The result is sA1*w, sA2*w, etc., where w represents the entire source code base. In FIG. 3, these results sAk*w are shown side by side. The left box is sA1*w, the next box is sA2*w, and so on. The first line in the result sA1*w represents sA1*w1, the second line represents sA1*w2, etc. Conversely, the first line in the result sA1*w represents sA1*w1, the first line in the result sA2*w represents sA2*w1, etc. The sAk*w1 are processed 365 to produce the decision bit 372 for reference set A and window w1. The sAk*w2 are similarly processed to produce the decision bit for reference set A and window w2. The decision bits for all windows wm together form the review vector 370A. Repeating for different reference sets 310B-J produces review vectors 370B-J for the different style issues.

Figure 4:
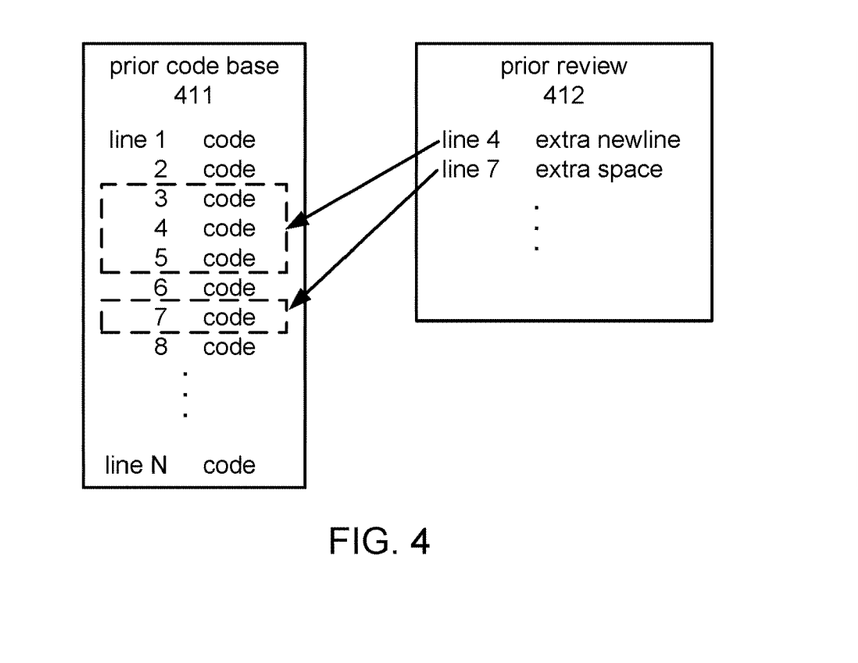
FIGS. 4-5 are diagrams illustrating different approaches to selecting source code samples for use in the reference sets of FIGS. 1-3.
Figure 5:
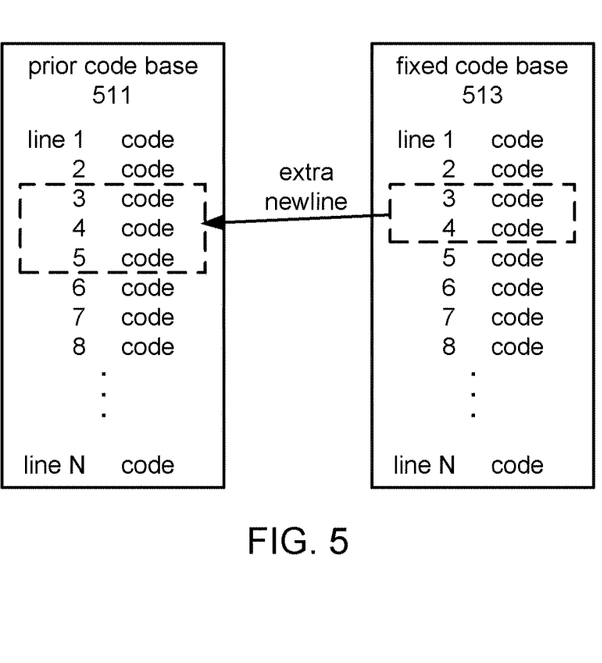

Because the style issues are defined by the samples in each reference set, the selection of samples is important. In addition, this selection preferably occurs automatically. FIGS. 4-5 are diagrams illustrating different approaches to selecting source code samples for use in the reference sets of FIGS. 1-3. All of these approaches are based on collecting the samples from prior code reviews. In FIG. 4, sample selection and extraction is based on manual tagging from prior code reviews. FIG. 4 shows a prior source code base 411 which has been manually reviewed producing the code review report 412. In this report, line 4 was identified as having an extra newline error and line 7 was identified as having an extra space error. The type of error may be identified based on syntax or labels used in the report 412. Alternatively, natural language processing or other techniques may be used to identify errors and corresponding locations.

The system then automatically extracts source code samples based on the identified errors. Because the error in line 4 is an extra newline error, the system includes additional lines before and after line 4 for the sample, so lines 3-5 are extracted as a source code sample for the extra newline error. No extra lines are extracted for the extra space error, so that source code sample is only line 7. The extracted samples are shown by the dashed boxes.

In FIG. 5, sample selection and extraction is based on comparing the source code base before and after correction of the style issue. Source code base 511 is before correction of style errors, and source code base 513 is after correction of style errors. Here, an extra newline has been removed, so pre-correction line 3 is the same as post-correct line 3, pre-correction line 4 is removed, and pre-correction line 5 is the same as post-correction line 4. Automated computer comparison of the two code bases 511 and 513 reveals the difference between the two code bases, thus identifying a style issue in code base 511. Further automated analysis may reveal that the style issue is an extra newline issue.

In one variation, the location of the errors may be known, but the type of error may not be. In that case, samples extracted from the different locations may be grouped together based on unsupervised clustering techniques. Each cluster of samples forms the basis of a reference set. Alternatively, if reference sets already exist, then new samples of style issues may be added to a reference set based on similarities with the existing examples in that reference set.

Figure 6:
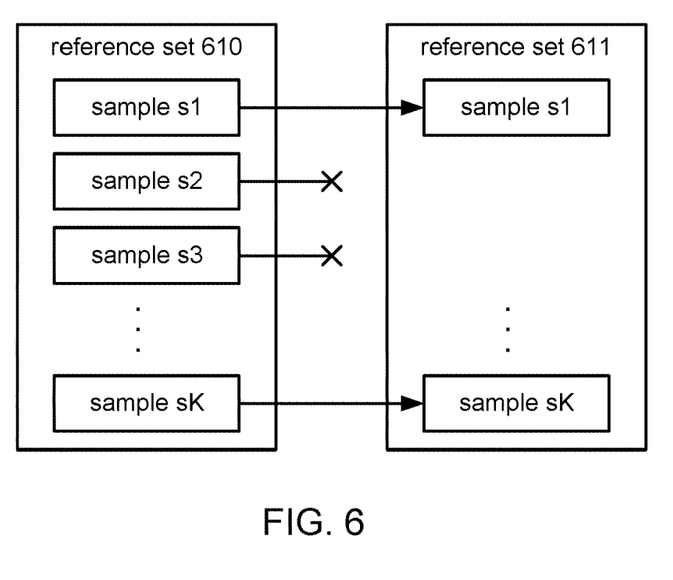
FIGS. 6-7 are diagrams illustrating different approaches for evolving reference sets.
Figure 7:
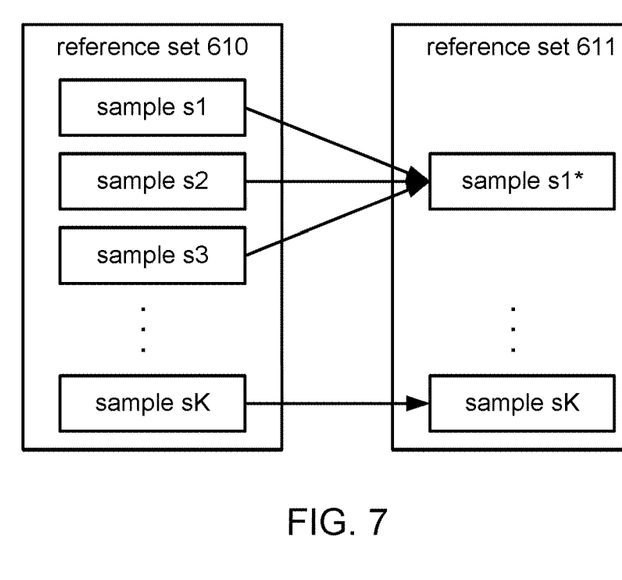

FIGS. 6-7 are diagrams illustrating different approaches for evolving reference sets. For example, in FIG. 6, samples s1, s2 and s3 in reference set 610 are similar and somewhat duplicative. This may be determined using tests based on correlation or mutual information, for example. Similar or duplicative samples may be removed. Weights could also be adjusted. If samples s1, s2 and s3 are very similar but this type of example occurs more frequently than other examples, perhaps samples s2 and s3 are removed as shown in FIG. 6. Sample s1 is retained and it may be given a higher weight to reflect the more frequent occurrence of this class of sample. Weights could also be used to reflect time aging. New samples may be initialized with a high weight. The weight is then reduced over time as the sample ages.

FIG. 7 shows the creation of "synthetic" samples. These are samples that are automatically created by combining other samples. For example, if samples s1, s2 and s3 are similar, rather than deleting two of the samples and keeping the third, the samples could be combined into a synthetic sample that captures the information from all three samples. Wildcards could be used to capture some of this information. For example, an automated comparison of samples s1, s2 and s3 may reveal that some characters do not matter or the number of characters at certain points in the sample do not matter.

Figure 8:
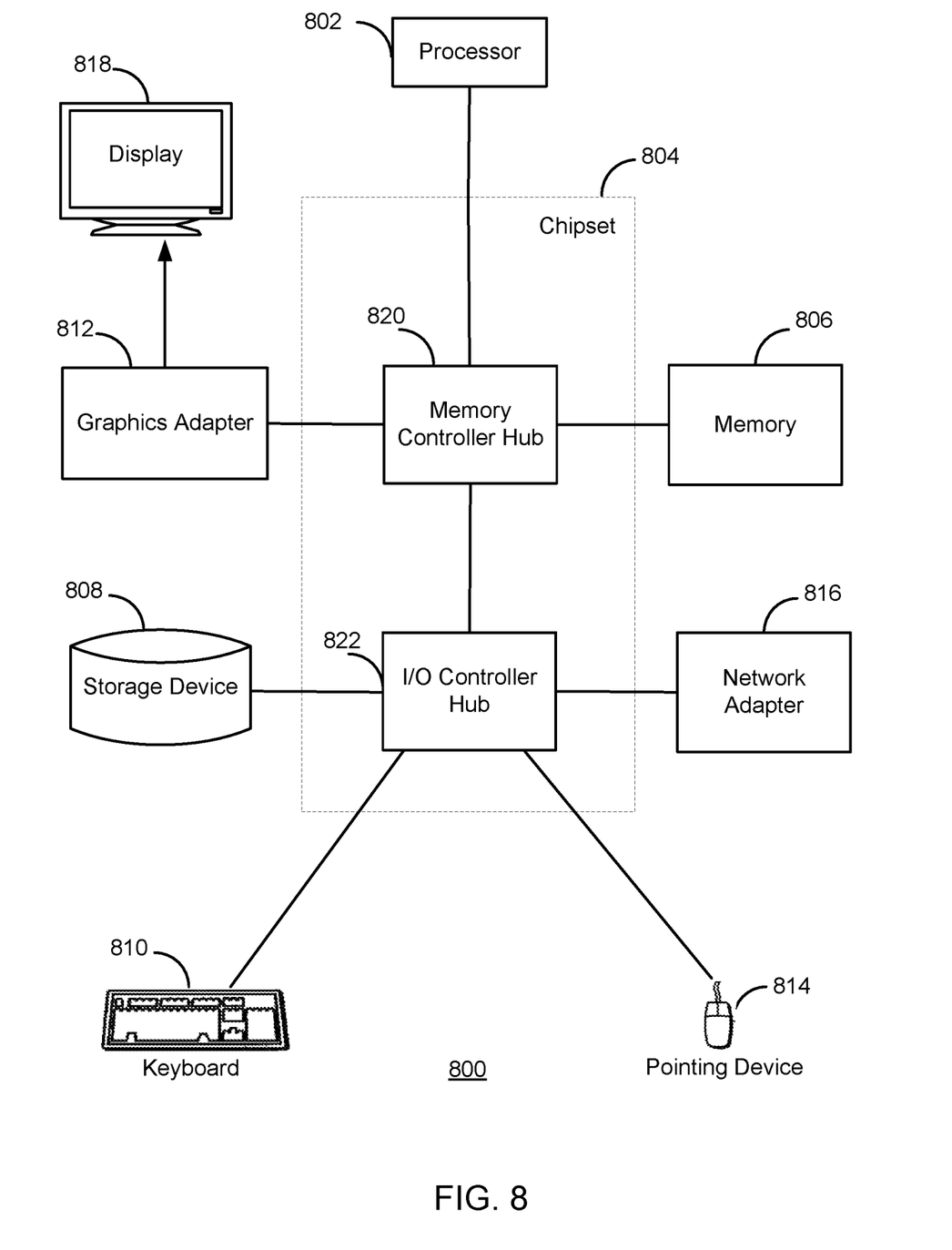
FIG. 8 is a block diagram of a computer system suitable for use in implementing the automatic identification of style issues described above.

FIG. 8 is a high-level block diagram illustrating an example of a computer system 800 for use as one or more of the components described above, according to one embodiment. Illustrated are at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display device 818 is coupled to the graphics adapter 812. A storage device 808, keyboard 810, pointing device 814, and network adapter 816 are coupled to the I/O controller hub 822. Other embodiments of the computer 800 have different architectures. For example, the memory 806 is directly coupled to the processor 802 in some embodiments.

The storage device 808 includes one or more non-transitory computer-readable storage media such as a hard drive, compact disk read-only memory (CD-ROM), DVD, or a solid-state memory device. The memory 806 holds instructions and data used by the processor 802. The pointing device 814 is used in combination with the keyboard 810 to input data into the computer system 800. The graphics adapter 812 displays images and other information on the display device 818. In some embodiments, the display device 818 includes a touch screen capability for receiving user input and selections. The network adapter 816 couples the computer system 800 to a network. Some embodiments of the computer 800 have different and/or other components than those shown in FIG. 8.

The computer 800 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 808, loaded into the memory 806, and executed by the processor 802.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method implemented on a computer system, the computer system executing instructions for automatically identifying style issues in a source code base, the method comprising:
   accessing a reference set for a style issue, the reference set including source code examples that exhibit the style issue, the style issue including an error;
   generating a feature set using string convolution to evaluate the source code based on a window of the source code, the window of the source code including or based on a number of lines, the number of lines including a line which includes the error;
   comparing the source code examples in the reference set to the source code base, the source code examples including a first source code example comprising a source code line immediately before a location of the error and a source code line immediately after the location of the error;
   determining a peak value of the string convolution based on the feature set;

calculating and combining individual scores of each source code examples in the reference set to derive a likelihood of the style issue for the reference set or the window; and based on the comparison, identifying locations in the source code base that are likely to exhibit the style issue within a single window of source code.

2. The computer implemented method of claim 1, wherein the error is a new line error.

3. The computer implemented method of claim 1, wherein the style issue is one of: an extra newline issue, an extra space issue, a missing newline issue, a missing space issue, and an unwanted indentation issue.

4. The computer implemented method of claim 1, wherein the number of lines included in the window is at least three lines of source code.

5. The computer-implemented method of claim 1 wherein the method is used by an organization to identify style issues relative to the organization's desired style, and the method further comprises:

collecting the source code examples from the organization's prior style reviews of other source code bases.

6. The computer-implemented method of claim 5, wherein collecting the source code examples comprises:

accessing the prior style reviews and the prior source code bases, wherein the prior style reviews identify locations in the prior source code bases that exhibit the style issue.

7. The computer-implemented method of claim 5, wherein the source code examples in the reference set are modified over time.

8. The computer-implemented method of claim 5, wherein the source code examples in the reference set are combined to produce synthetic source code examples.

9. The computer-implemented method of claim 5, wherein the synthetic source code examples include wildcards.

10. The computer-implemented method of claim 1, further comprising:

automatically making suggestions to fix the locations in the source code base identified as likely to exhibit the style issue.

11. The computer-implemented method of claim 1, wherein the reference set further includes source code counter-examples that do not exhibit the style issue.

12. The computer-implemented method of claim 1, wherein the method is performed for multiple known style issues, each known style issue having a reference set that includes source code examples that exhibit that style issue.

13. A computing apparatus comprising:
a processor; and
a memory storing instructions that, when executed by the processor, configure the apparatus to:
access a reference set for a style issue, the reference set including source code examples that exhibits the style issue, the style issue including an error;
generate a feature set using string convolution to evaluate the source code based on a window of the source code, the window of the source code including a number of lines, the number of lines including a line which includes the error;
compare the source code examples in the reference set to the source code base, the source code examples including a first source code example comprising a source code line immediately before a location of the error and a source code line immediately after the location of the error;
determine a peak value of the string convolution based on the feature set;
calculate and combine individual scores of each of the source code examples in the reference set to derive a likelihood of the style issue for the reference set or window; and
based on the comparison, identify locations in the source code base that are likely to exhibit the style issue within a single window of source code.

14. The computing apparatus of claim 13, wherein the error is a new line error.

15. The computing apparatus of claim 13, wherein the style issue is one of: an extra newline issue, an extra space issue, a missing newline issue, a missing space issue, and an unwanted indentation issue.

16. The computing apparatus of claim 13, wherein the number of lines included in the window is at least three lines of source code.

17. A non-transitory computer-readable storage medium, the computer-readable storage medium including instructions that when executed by a computer, cause the computer to:

access a reference set for a style issue, the reference set including source code examples that exhibits the style issue, the style issue including an error;
generate a feature set using string convolution to evaluate the source code based on a window of the source code, the window of the source code including a number of lines, the number of lines including a line which includes the error;
compare the source code examples in the reference set to the source code base, the source code examples including a first source code example comprising a source code line immediately before a location of the error and a source code line immediately after the location of the error;
determine a peak value of the string convolution based on the feature set;
calculate and combine individual scores of each of the source code examples in the reference set to derive a likelihood of the style issue for the reference set or window; and
based on the comparison, identify locations in the source code base that are likely to exhibit the style issue within a single window of source code.

18. The computer-readable storage medium of claim 17, wherein the error is a new line error.

19. The computer-readable storage medium of claim 17, wherein the number of lines included in the window is at least three lines of source code.

* * * * *